United States Patent [19]

Rabitsch

[11] Patent Number: 5,174,101
[45] Date of Patent: Dec. 29, 1992

[54] PROTECTIVE COVER FOR COMBINE SKID PLATES

[76] Inventor: Thermon D. Rabitsch, P.O. Box 349, Monticello, Ga. 31064

[21] Appl. No.: 791,672

[22] Filed: Nov. 14, 1991

[51] Int. Cl.⁵ .................... A01D 34/04; A01D 34/40
[52] U.S. Cl. ................................. 56/17.4; 56/119; 56/DIG. 24
[58] Field of Search ............... 56/6, 13.6, 17.2, 17.4, 56/119, 208, 295, 309, 311, 320.1, DIG. 24

[56] References Cited

U.S. PATENT DOCUMENTS

| | | | |
|---|---|---|---|
| 4,103,476 | 8/1978 | Oosterling et al. | 56/13.6 |
| 4,573,308 | 3/1986 | Ehrecke et al. | 56/208 X |
| 4,633,696 | 1/1987 | Willinger | 56/6 X |
| 4,729,212 | 3/1988 | Rabitsch | 56/119 |
| 5,012,635 | 5/1991 | Walters et al. | 56/6 X |

Primary Examiner—George A. Suchfield
Attorney, Agent, or Firm—Mason, Fenwick & Lawrence

[57] ABSTRACT

A cover for use on the outer surface of a skid plate of a combine grain head comprises a plurality of side-by-side cover panels, each cover panel corresponding to a specific skid plate panel of the skid plate. The inner surface of each cover panel is configured to matingly engage the outer surface of its corresponding skid plate panel, while the outer surface of each cover panel is substantially parallel to its inner surface and has formed therein a first living hinge adjacent and parallel to the leading edge of the cover panel and a second living hinge adjacent and parallel to the trailing edge of the cover panel. The living hinges permit the angles of the leading and trailing edges to be adjusted to accommodate tolerances in the manufacture of the skid plate panels and to accommodate deformations which occur in the cover panels due to the passage of time and variations in temperature.

1 Claim, 4 Drawing Sheets

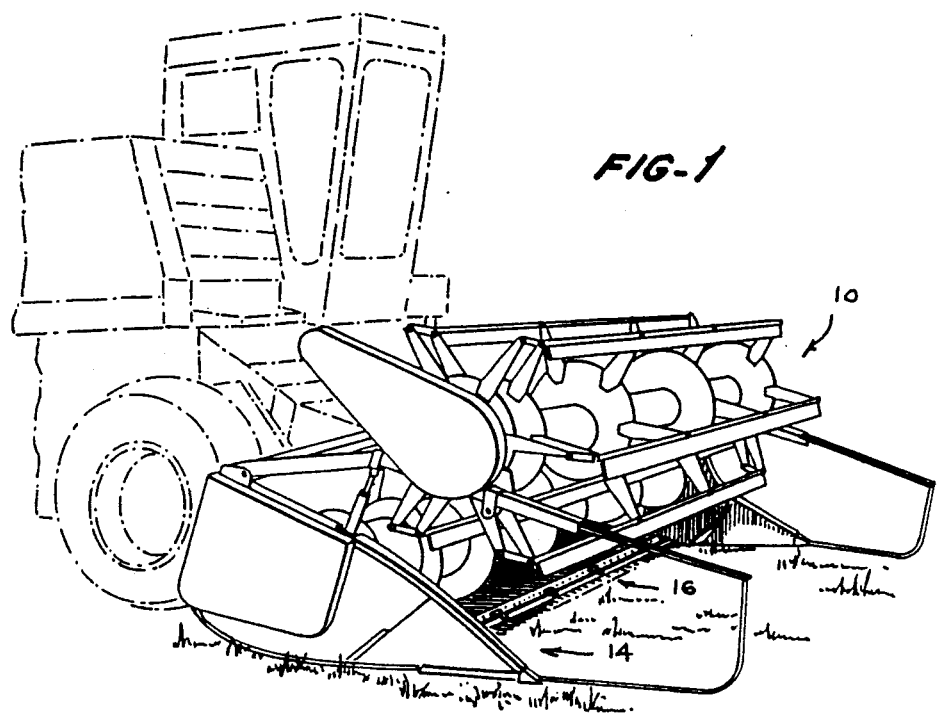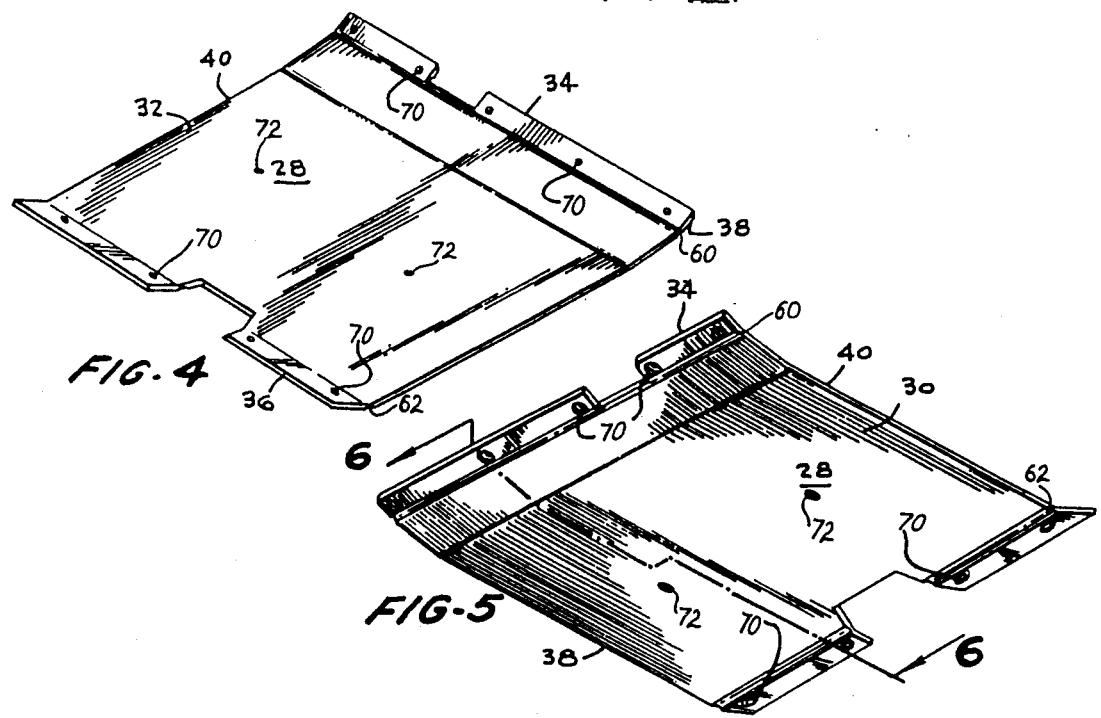

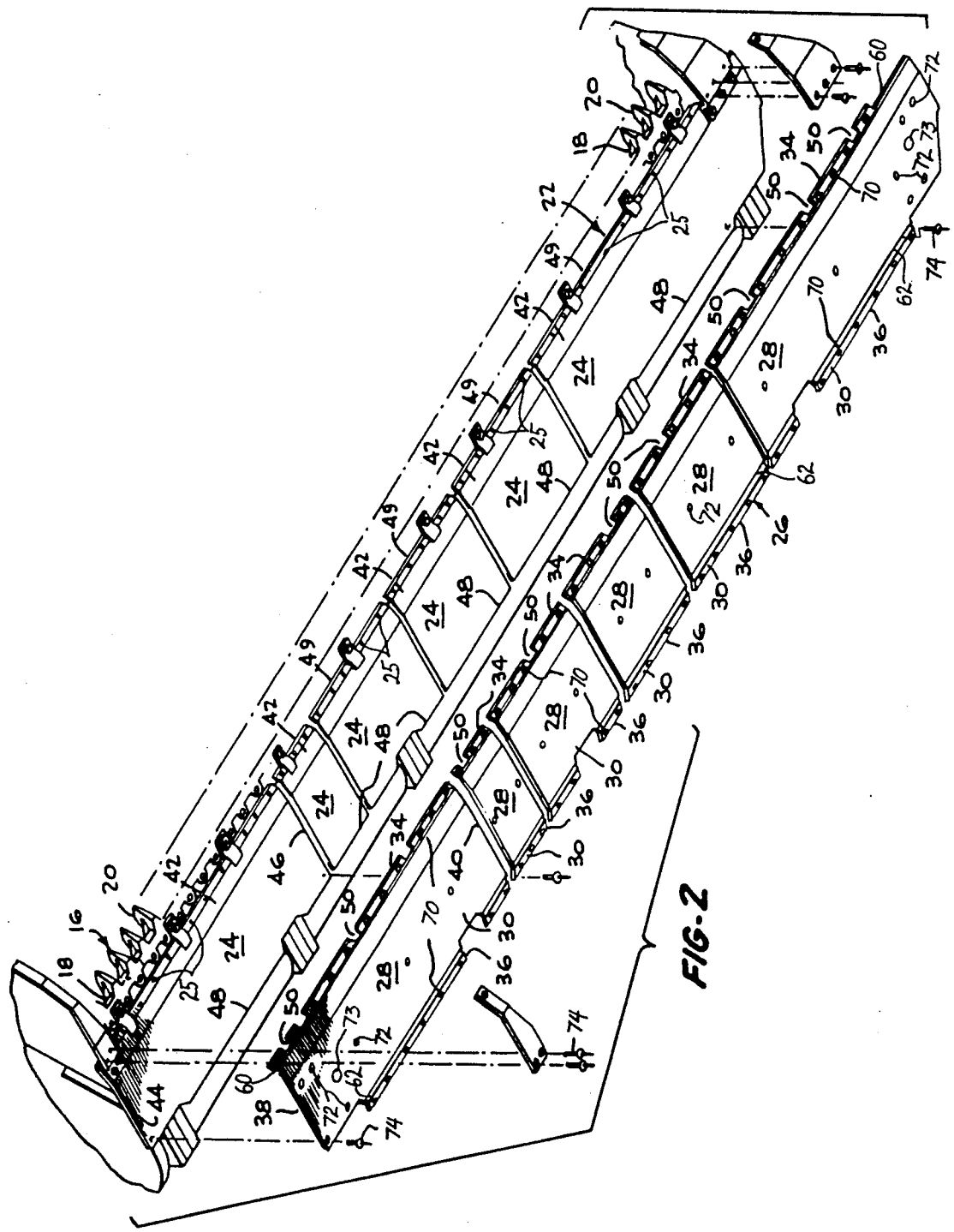

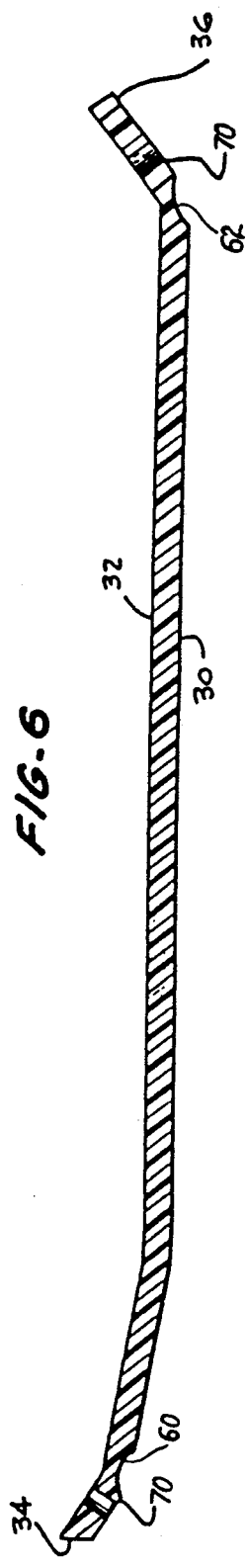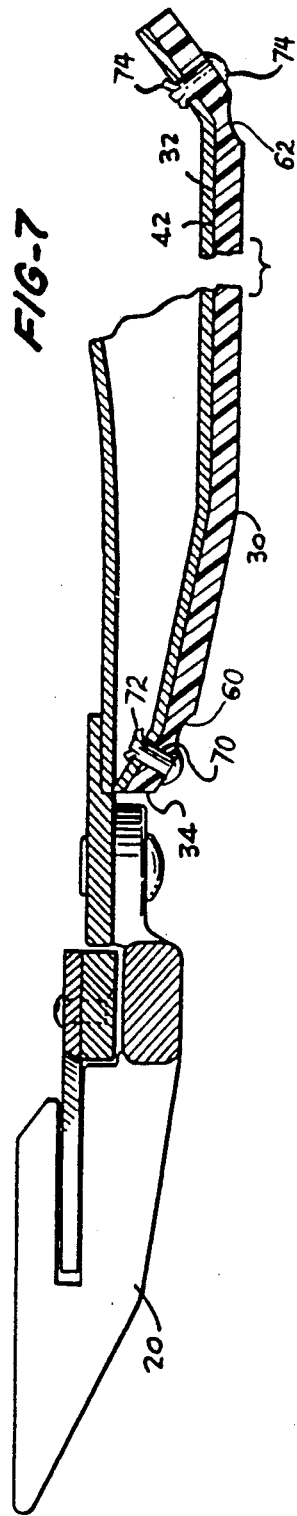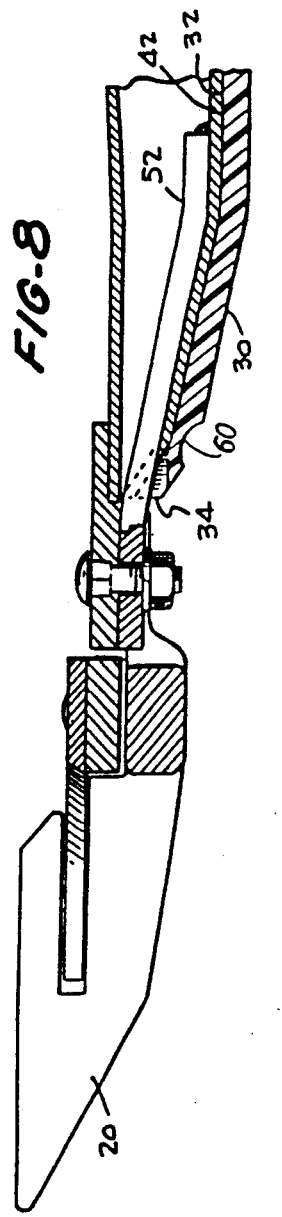

5,174,101

PROTECTIVE COVER FOR COMBINE SKID PLATES

BACKGROUND OF THE INVENTION

1. Field of the Invention

The present invention relates to combine skid plates or shoes for agricultural equipment. More specifically, the invention relates to a protective cover for such skid plates or shoes for preventing adhesion of soil thereto and the damage caused adhesion of the soil to the skid plates and the combine header.

2. Related Art

My U.S. Pat. No. 4,729,212, which is incorporated herein by reference in its entirety, is directed to a protective cover for skid plates of a self-propelled combine 10 as shown in FIG. 1. This protective cover comprises a plurality of side-by-side cover panels, each cover panel corresponding to a specific skid plate panel of the combine, and the inner surface of each cover panel being configured to matingly engage the outer surface of its corresponding skid plate panel. The cover panels are attached to their corresponding skid plate panels by rivets, bolts, screws, or the like fasteners inserted through pre-drilled holes in the cover panels and corresponding holes either pre-punched by the manufacturer or drilled by the installer in the skid plate panels. The cover panels are made from a plastic material, preferably an ultra high molecular weight polyethylene plastic, having a low coefficient of friction to resist the adhesion of soil thereto.

Due to the success of the invention which is the subject of my '212 patent, at least one major manufacturer of combines has begun to pre-punch holes in their combine skid plate panels at the time of manufacture, in order to enable installation of the cover panels in accordance with the '212 patent at the factory or as a dealer-installed option. However, the manufacturing tolerance both in the pre-punched holes and in the angle of the outer surface of the combine skid plate panels is substantial, sometimes resulting in a lack of the necessary mating engagement between the combine skid plate panels and their cover panels. Further adding to this problem is the fact that the passage of time and variations in temperature may result in deformation of the cover panels. In particular, the cover panels are bent into their required configurations by cold pressing, and the plastic material used for the cover panels "remembers" its original shape, so that over time, the cover panels tend to flatten out. Also, the plastic material may expand or contract due to temperature variations. It is to the solution of these and other problems to which the present invention is directed.

SUMMARY OF THE INVENTION

It is a primary object of the present invention to provide a protective cover for combine skid plates which can accommodate varying tolerances in the manufacture of the combine skid plates.

It is another object of the present invention to provide a protective cover for combine skid plate panels which can accommodate deformations in the protective cover to achieve mating engagement between the protective cover and the combine skid plate panels.

These and other objects of the present invention are achieved by the provision of a cover for use on the outer surface of the skid plate comprising a plurality of side-by-side cover panels corresponding in number to the number of skid plate panels. Each cover panel corresponds to a specific one of the skid plate panels and has an inner surface configured to matingly engage the outer surface of its corresponding skid plate panel and an outer surface substantially parallel to its inner surface. The side edges of each cover panel are slightly inset from the side edges of its corresponding skid plate panel, whereby each cover panel is spaced apart from its adjacent cover panel to permit relative horizontal movement between adjacent cover panels and their corresponding skid plate panels. Living hinges are provided parallel to the leading and trailing edges, whereby each cover panel can be custom fit to the contours of its corresponding skid plate panel. The cover panels are made from a material having a low co-efficient of friction, such as an ultra-high molecular weight polyethylene plastic.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 is a perspective view of a self-propelled combine;

FIG. 2 is an exploded bottom perspective view of a skid plate cover according to the invention in association with a combine skid plate;

FIG. 4 is a perspective view of the inner surface of a panel of the skid plate cover of the invention;

FIG. 5 is a perspective view of the outer surface of a panel of the skid plate cover of the invention;

FIG. 6 is a cross-sectional view of the panel of FIG. 5, taken along line 6—6 of FIG. 5;

FIG. 7 is a cross-sectional view of the cover and skid plate of FIG. 3, taken along line 7—7 of FIG. 3; and FIG. 8 is a cross-sectional view of the cover and skid plate of FIG. 3, taken along line 8—8 of FIG. 3.

DETAILED DESCRIPTION OF THE PREFERRED EMBODIMENTS

Figure 3:
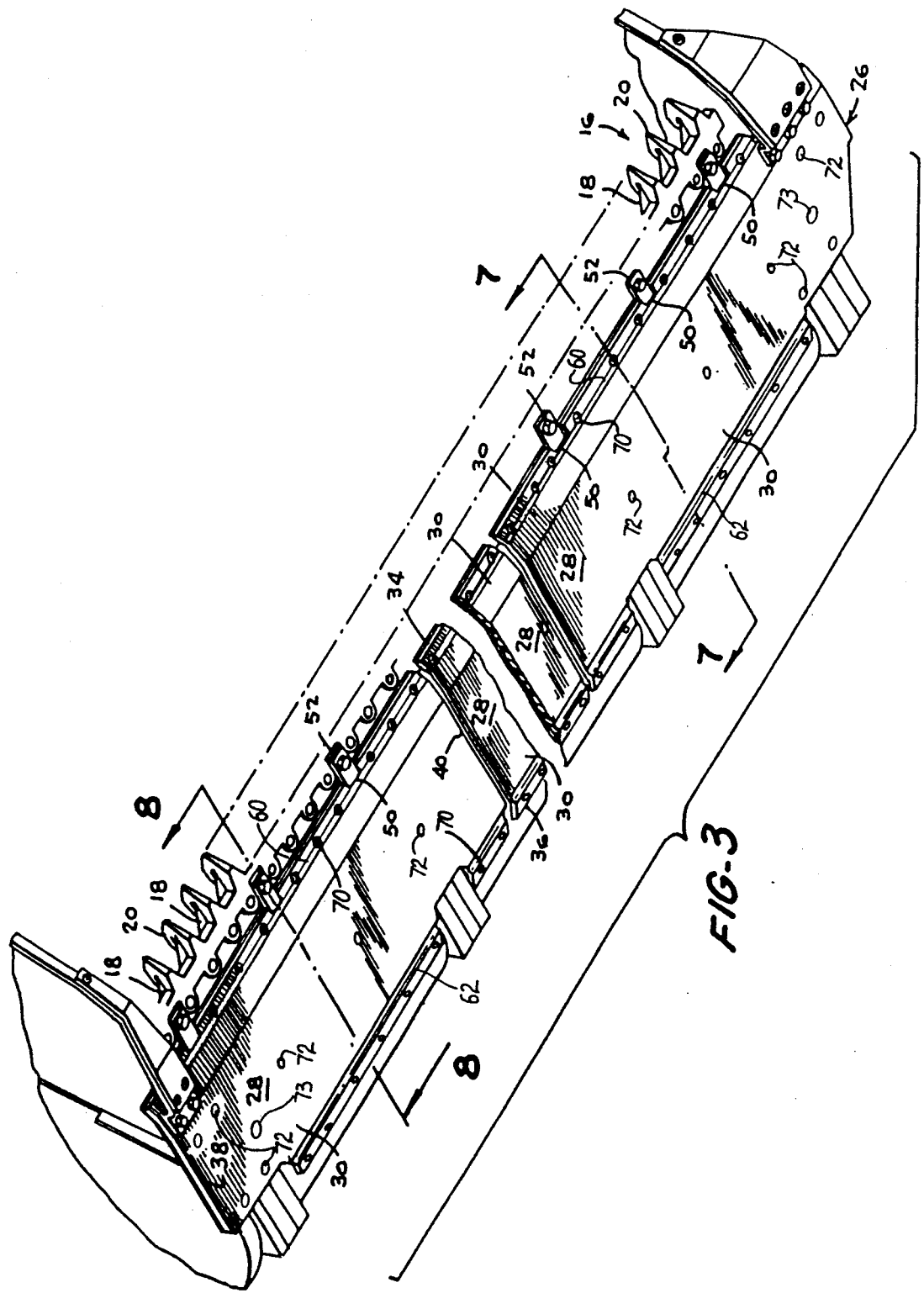
FIG. 3 is a bottom perspective view of a skid plate cover according to the invention mounted on a skid plate.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring now to FIG. there is shown a self-propelled combine 10. For purposes of illustration, a combine Model 920 manufactured by John Deere is shown. However, the invention is applicable to all makes of combines.

As shown in FIGS. 1-3, combine 10 includes a grain head 14 for harvesting crops such as soy beans or other beans or wheat or other small grains. Grain head 14 in turn comprises a substructure (not shown), a cutterbar assembly 16 including cutter knives is mounted on the front of the substructure for horizontal reciprocating motion, guides or guards 20 mounted on the front of the substructure between and extending forward of cutter knives 18, and a skid plate or shoe 22 mounted on the bottom of the substructure rearwardly of cutter knives 18 and guards 20. As can be seen from FIG. 2, skid plate 22 comprises multiple panels 24 of varying widths and shapes, and which are made of steel. These panels 24 are bent at an angle adjacent their leading and trailing edges, and can be provided with pre-punched holes 25 for use in attaching a protective cover in accordance with the invention.

Referring now to FIGS. 2-8, there is shown a preferred embodiment of the invention specifically adapted for use with a John Deere combine Model 920 in which the reference numeral 26 refers to a combine skid plate cover according to the invention. Cover 26 comprises a plurality of side-by-side cover panels 28 of different sizes, the number of panels 28 depending upon the specific combine platform skid plate on which it is to be used. Cover 26 can be used on either rigid or flexible platforms.

Each manufacturer of combines makes several different widths of combines, using a combination of standard (for that manufacturer) skid plate panels of different widths (and sometimes different depths). The widest combine made by a manufacturer generally will include at least on of all of that manufacturer's standard skid plate panels, while the smaller combines will include combinations of less than all of its standard skid plate panels. By manufacturing a cover panel according to the invention corresponding to each size of skid plate panel made by a particular manufacturer, it is possible to provide a cover 26 for any size combine of that manufacturer. For skid plate 22 illustrated in FIG. 2, there are six skid plate panels 24 of varying widths, and correspondingly, six cover panels 28, each cover panel 28 corresponding to a specific one of the skid plate panels 24.

Each cover panel 28 has an outer surface 30, an inner surface 32, opposed leading and trailing edges 34 and 36, and a pair of opposed side edges 38 and 40. Further, each cover panel 28 is bent at an angle parallel to its leading and trailing edges 34 and 36, and a second bend is provided parallel to leading edge 34, whereby the inner surface 32 of each cover panel 28 is configured to matingly engage the outer surface 42 of its corresponding skid plate panel 24.

As shown in FIGS. 2 and 3, the side edges 44 and 46 of skid plate panels 24 are in some cases overlapping and in other cases spaced-apart in order to accommodate movement between skid plate panels 24 as head 34 moves over uneven ground. The side edges 38 and 40 of each cover panel 28 are inset slightly (generally from ¼ to ½ inch) from the side edges 44 and 46 of its corresponding skid plate panel 24 in order that adjacent cover panels 28 are spaced apart from each other to permit relative horizontal movement between them and their corresponding skid plate panels 24.

As best shown in FIG. 2, preferably, the trailing edge 36 of each cover panel 28 will substantially coincide with the trailing edge 48 of its corresponding skid plate panel 24. However, the leading edge 34 of each cover panel 28 must be adapted to provide clearance for the substructure on which the cutterbar assembly 16 is mounted. The manner in which this is accomplished depends upon the structure of the specific head 14. For example, I have found that for John Deere combines such as combine 10 shown in FIGS. 1-3, 7 and 8, it is preferable to conclude the leading edge 34 at the leading edge 49 of its corresponding skid plate panel 24 and to provide notches 50 in leading edges 34 to accommodate skid plate attachment plates 52 used to bolt skid plate panels 24 to cutterbar assembly 16 and also as shown in FIG. 7 to cut leading edges 34 at an angle to clear guides 20. In contrast, International Harvester provides a lip under the cutterbar assembly of its grain head, and I have found that it is therefore preferable for an International Harvester grain head to shape the leading edge of the cover panels to conclude at this lip. Similar adaptations must be made for combines made by other manufacturers, in a manner which will be understood by those of skill in the art.

In order to accommodate varying tolerances in the manufacture of the combine skid plates 24 and the placement of holes 25 therein, and deformations which may occur in protective cover 26 due to the passage of time and variations in temperature, each cover panel 28 is provided with forward and rearward living hinges 60 and 62 at the bends parallel to leading and trailing edges 34 and 36, respectively. Living hinges 60 and 62 are sized to permit the angles of leading and trailing edges 34 and 36 to be adjusted as required upon the application of sufficient force (for example by the use of pliers, a wrench, or a similar hand tool), yet to stay in position once bent. For example, for a ¼ inch cover panel 28, living hinges 60 and 62 can have a thickness of approximately ⅛ inch.

The skid plate cover according to my invention must be made from a material which has a low coefficient of friction, so that soil will not adhere to it, but which also is extremely abrasion and impact resistant so that it will not deteriorate quickly from regular use. A material which possesses these qualities and is particularly well suited to molding in the necessary shape is polyethylene plastic. Preferably, ultra-high molecular weight polyethylene plastic in ¼ inch sheets is used. This material has 5 million molecules per cubic inch, and is rendered extremely abrasion and impact resistant because of this ultra-high molecular weight.

Virgin ultra-high molecular weight polyethylene is white in color, have found it desirable to add to the material a yellow pigment. This pigment is ultra violet stabilized so that the material with the pigment added lasts longer outside, thus enhancing the wearability over the unpigmented virgin material. Adding this pigment to virgin polyethylene plastic also enhances wearability of that material. The ultra-high molecular weight polyethylene with the pigment added is commercially available from Poly-Hi in Fort Wayne, Indiana, is Tivar 100®, and from Solidur Plastics Co., in Pittsburgh, Pennsylvania under the trade name Solidur 10-602.

In order to attach cover panels 28 to their corresponding skid plate panels 24, a standard pattern of predrilled holes 70 is provided along leading and trailing edges 34 and 36, and a standard pattern of predrilled holes 72 is provided intermediate leading and trailing edges 34 and 36, for receiving attachment means such as rivets 74, or bolts, screws, or the like fasteners. It is critical that holes 70 be placed along leading and trailing edges 34 and 36, and that holes 72 be placed intermediate edges 34 and 36, so as to avoid the substructure (not shown) to which skid plate panels 24 are mounted. Holes 72 provide a better fit between cover panels 28 and skid plate panels 24 than holes 70 alone, in that when rivets 74 are driven through cover panels 28 and skid plate panels 24 at this intermediate position, they become more intimately associated, thus preventing dirt from being scooped in at their side edges when the combine is turned with its head 14 on the ground.

A Grease fitting clearance holes 73 can also be provided intermediate leading and trailing edges 34 and 36.

The pigmented ultra-high molecular weight polyethylene is converted from a flat sheet to the required profile for a cover panel 28 by a cold forming operation using a press brake. Living hinges 60 and 62 are formed by routing or machining the outer surface 30 of cover panel 28. Notches 50 and holes 70, 72, and 73 preferably are formed by a commercially available computer-controlled router, such as a Thermwood Router Model 80 SP. Preferably, holes 70 are not counterbored, although they can be counterbored as shown in my '212 patent; and holes 72 preferably are counterbored.

Preferably, 3/16 steel rivets 74 are used to attach cover panels 28, and holes 70 and 72 are drilled to accommodate such rivets. Holes 72 are counterbored so that the heads of rivets 74 are below outer surface 30, which is the wear surface of cover panels 28. Holes 70 are elongated to better accommodate manufacturing tolerances in the placement and size of holes 25.

In accordance with the invention, cover panels 28 are attached to their corresponding skid plate panels 24 as follows. The steel skid plate panels must first be cleaned with a wire brush or the like. Then, cover panels 28 are matched with their corresponding skid plate panels 24, and their leading and trailing edges 34 and 36 ar bent at living hinges 70 and 72 so that cover panels 28 fit the contours of their corresponding skid plate panels 28.

Preferably, one cover panel 28 is bent and installed at a time. In general, it is preferable to drive rivets 74 first through holes 70 in leading edge 34, second through holes 70 in trailing edge 36, and third in holes 72 intermediate leading and trailing edges 34 and 36. Rivets 74 are driven first in all holes 70 and 72 having corresponding pre-punched holes 25 in skid plate panel 24.

Beginning at the leading edge 34 under cutterbar assembly 16, the first cover panel 28 is positioned on its corresponding skid plate panel 24 and held in place. This cover panel 28 can be held in place by hand (by a second party) or by clamps on the leading and trailing edges to lightly hold the cover panel 28 against skid plate panel 24. Then, any additional holes which are required in skid plate panel 24 are punched and drilled, and rivets 74 are driven therethrough. The same procedure is followed for each cover panel.

I have found that it is best to drill the holes in skid plate panels 28 with a split point drill bit to prevent the drill bit from walking. Because a feature of my invention is that the cover panels are predrilled with a standard hole pattern, replacement cover panels 28 can be fitted to their corresponding skid plate panels 28 without the necessity of redrilling the skid plate panels 28.

Thus, it will be seen that the present invention eliminates the adhesion of soil to the skid plate, thereby enabling the skid plate to be operated as low to the ground as possible so that all crops can be harvested, reducing the power required to push the combine and therefore reducing fuel consumption of the combine, and extending the life of the skid plate. Moreover, installation of the skid plate cover is easy to accomplish so as to render use of the invention convenient to users.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than a specifically described.

WHAT IS CLAIMED IS:

1. A cover for use on the outer surface of a skid plate of a combine grain head, and the skid plate comprising a plurality of side-by-side skid plate panels of different widths, and each skid plate panel having an outer surface, opposed leading and trailing edges, and a pair of opposed side edges, said cover comprising:

a plurality of side-by-side cover panels, each said cover panel corresponding to a specific one of the plurality of skid plate panels and each said cover panel having an outer surface, an inner surface, opposed leading and trailing edges, and a pair of opposed side edges, said inner surface of each said cover panel being configured to matingly engage the outer surface of its corresponding skid plate panel, said outer surface of each said cover panel being substantially parallel to said inner surface thereof and having formed therein a first living hinge adjacent and parallel to said leading edge and a second living hinge adjacent and parallel to said trailing edge, said cover panels being made from a material having a low coefficient of friction, whereby said cover panels will resist the adhesion of soil thereto.

* * * * *